United States Patent [19]

Martin

[11] Patent Number: 4,865,389
[45] Date of Patent: Sep. 12, 1989

[54] CONTROL SYSTEM FOR VEHICLES

[75] Inventor: John C. Martin, Toronto, Canada

[73] Assignee: Diesel Equipment Limited, Toronto, Canada

[21] Appl. No.: 142,332

[22] Filed: Dec. 30, 1987

Related U.S. Application Data

[63] Continuation of Ser. No. 785,209, Oct. 7, 1985, abandoned.

[51] Int. Cl.$^4$ .............................................. B60P 1/16
[52] U.S. Cl. .................................... 298/22 C; 91/459; 180/53.5
[58] Field of Search ................. 91/459, 461; 180/53.4, 180/53.5; 298/22 C, 22 R

[56] References Cited

U.S. PATENT DOCUMENTS

| | | | |
|---|---|---|---|
| 2,231,058 | 2/1941 | Doran | 298/22 C X |
| 2,414,602 | 1/1947 | Mott | 180/53.5 X |
| 3,180,628 | 4/1965 | Pullin | 298/22 R |
| 4,084,708 | 4/1978 | Goodvin | 414/24.6 |
| 4,182,534 | 1/1980 | Snyder | 298/22 C |

FOREIGN PATENT DOCUMENTS 827913  2/1960  United Kingdom ............. 298/22 C

*Primary Examiner*—Robert J. Spar
*Assistant Examiner*—Janice Krizek
*Attorney, Agent, or Firm*—Fetherstonhaugh & Co.

[57] ABSTRACT

In a motor vehicle such as a truck or the like having a battery-operated low voltage electrical system, an hydraulically powered system for operating one or more high power hydraulic rams or the like and a pneumatic system for regulating the operation of the hydraulic system, the improvement wherein the pneumatic system is powered by a low capacity compressor which is powered by a low voltage electric motor which is electrically connected to the low voltage circuit of the motor vehicle to drive the compressor to pressurize the pneumatic system as required in use.

11 Claims, 3 Drawing Sheets

CONTROL SYSTEM FOR VEHICLES

This application is a continuation of application Ser. No. 785,209, filed Oct. 7, 1985 now abandoned.

This invention relates to pneumatic controls for a motor vehicle. In particular, this invention relates to improvements in the pneumatic controls for controlling the operation of a hydraulically-powered lift system of a dump truck or the like.

PRIOR ART

In trucks such as dump trucks which have an hydraulic power system for raising and lowering the container body, two distinctly different types of controls have been available for controlling the operation of the hydraulic power system.

When a compressed air system is provided for the purposes of operating the brakes of the vehicle, it is common practice to tap into this system to obtain a source of compressed air for use in operating a pneumatic control system for the hydraulic power system.

Air brakes have long been criticized as being unreliable because of leakage which can occur and the practice of tapping into the air brake system to obtain a source of pneumatic power for operating the pneumatic control system further increases the likelihood of leakage.

A mechanical linkage system for controlling the operation of the hydraulic power system has also been available for many years. This mechanical linkage system permits the driver of the vehicle to directly manipulate the control valves which control the supply of hydraulic fluid. These devices are, however, expensive to install and difficult to maintain in good working order.

In practice, if an air brake system is being used on the vehicle, most dump trucks would employ a pneumatic control system for controlling the operation of the hydraulic power system by tapping into the air brake system. In circumstances where an air brake system is not available, the only alternative which has been proposed to date is the use of a mechanical linkage system.

The air compressors which are provided for the purposes of generating compressed air to operate a power brake system are large compressors driven directly from the engine of the vehicle. The air brake system employs a compressed air storage compartment which is charged by the compressor so as to provide a sufficient reservoir of compressed air to permit proper operation of the brakes.

The large compressors which are used in an air brake system are expensive pieces of equipment requiring expensive power take-off connections with the engine and for this reason, it is not considered to be economically practical to use such a compressor merely for the purposes of providing compressed air to operate pneumatic controls of a dump truck or the like.

SUMMARY OF INVENTION

It is an object of the present invention to provide a simple and inexpensive self-contained pneumatic system for regulating the operation of the hydraulic system of a motor vehicle.

It is a further object of the present invention to provide a self-contained pneumatic system for regulating the operation of the hydraulic system of a motor vehicle which is powered by the low voltage circuit of the motor vehicle.

It is yet another object of the present invention to provide a self-contained pneumatic system for controlling the operation of the hydraulic system of a dump truck or the like which is powered by a low voltage electric motor which is electrically connected to the low voltage circuit of the motor vehicle to drive a small compressor to pressurize the pneumatic system as required in use.

According to one aspect of the present invention, there is provided in a motor vehicle having a battery operated low voltage electrical system, an hydraulically powered system for operating one or more high power hydraulic devices and a pneumatic system for regulating the operation of the hydraulic system, the improvement wherein the pneumatic system is powered by a low capacity compressor which is powered by a low voltage electric motor which is electrically connected to the low voltage circuit of the motor vehicle to drive the compressor to pressurize the pneumatic system as required in use.

According to a further aspect of the present invention, there is provided in a motor vehicle having a battery operated low voltage electrical system, an hydraulically powered system for operating one or more high power hydraulic devices and a pneumatic system for regulating the operation of the hydraulic system, the improvement wherein the pneumatic system is powered by a low capacity compressor which is powered by a low voltage electric motor which is electrically connected to the low voltage circuit of the motor vehicle to drive the compressor to pressurize the pneumatic system as required in use, the further improvement of pressure sensing means in the pneumatic system for activating and deactivating the low voltage electric motor to maintain the pressure in the pneumatic system within predetermined limits.

These and other objects of the present invention will be more clearly understood after reference to the following detailed specification read in conjunction with the drawings wherein.

Figure 1:
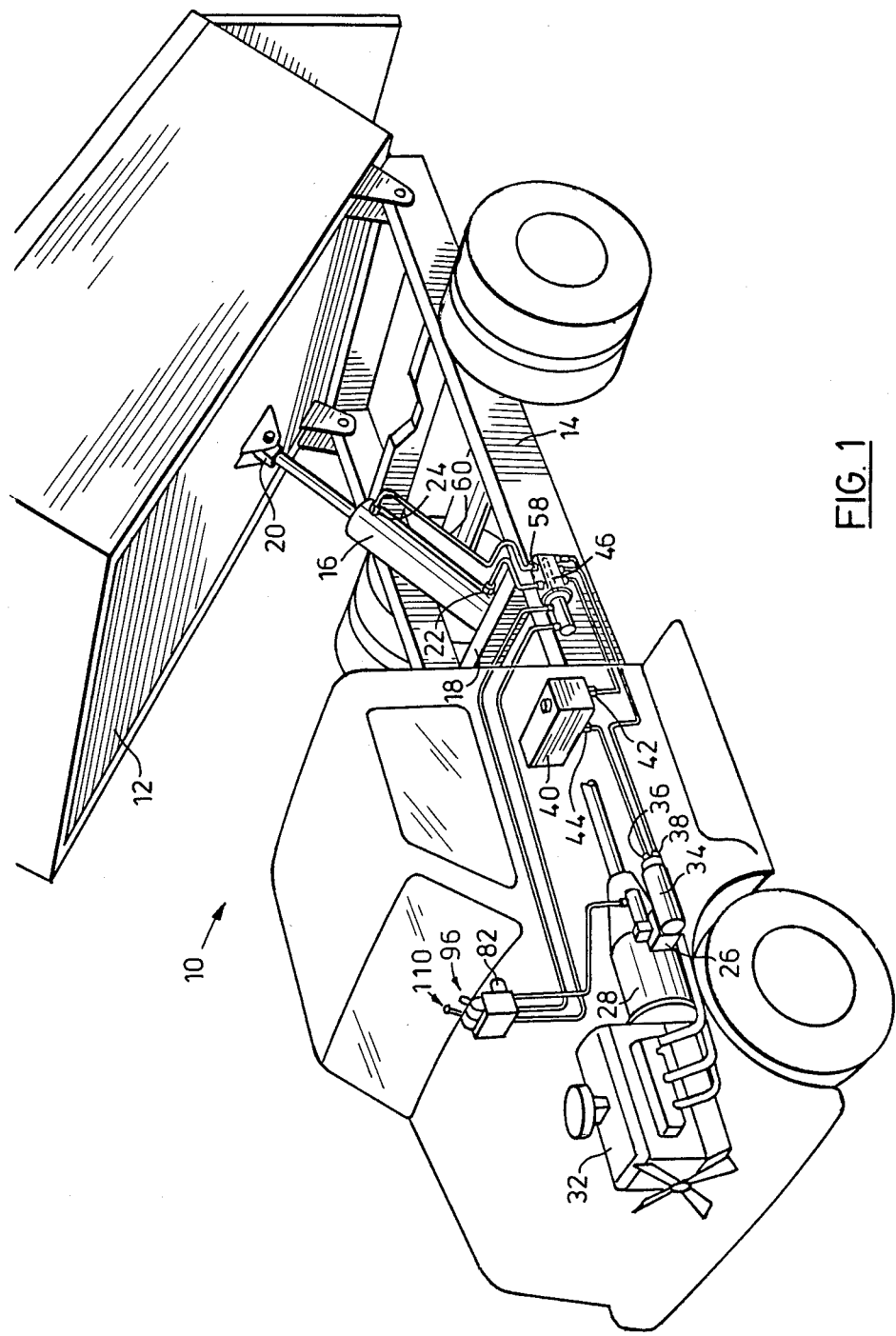
FIG. 1 is a diagrammatic pictorial representation of a dump truck constructed in accordance with an embodiment of the present invention.

With reference to FIG. 1 of the drawings, the reference numeral 10 refers generally to a dump truck which has a container body 12 mounted on a chassis 14. A double acting hydraulic lift cylinder 16 has one end mounted on the chassis 14 and the other end 20 connected to the container body 12. The cylinder 16 has first and second hydraulic fluid connections 22 and 24, each of which serve to admit hydraulic fluid to and drain hydraulic fluid from the cylinder 16 such that when fluid is admitted through the first connection 22, the cylinder 16 will be extended and when fluid is admitted through the second connection 24, the cylinder will be contracted to effect raising and lowering of the container body as required in use.

A power take-off 26 is mounted on the engine transmission housing 28 in a conventional manner and has an actuator arm 30 (FIG. 2) which is moveable to engage and disengage the power take-off from the transmission 28 of the engine 32. An hydraulic pump 34 is connected to the power take-off 26 to be driven when the power take-off is activated. The hydraulic pump 34 has an input 36 and an output 38. An hydraulic fluid reservoir 40 has an input port 42 and an output port 44. The output port 44 is connected to the input 36 of the hydraulic pump 34.

A first control valve 46 is mounted on the chassis 14. The first control valve 46 serves to control the supply of hydraulic fluid to the lift cylinder 16.

Figure 2:
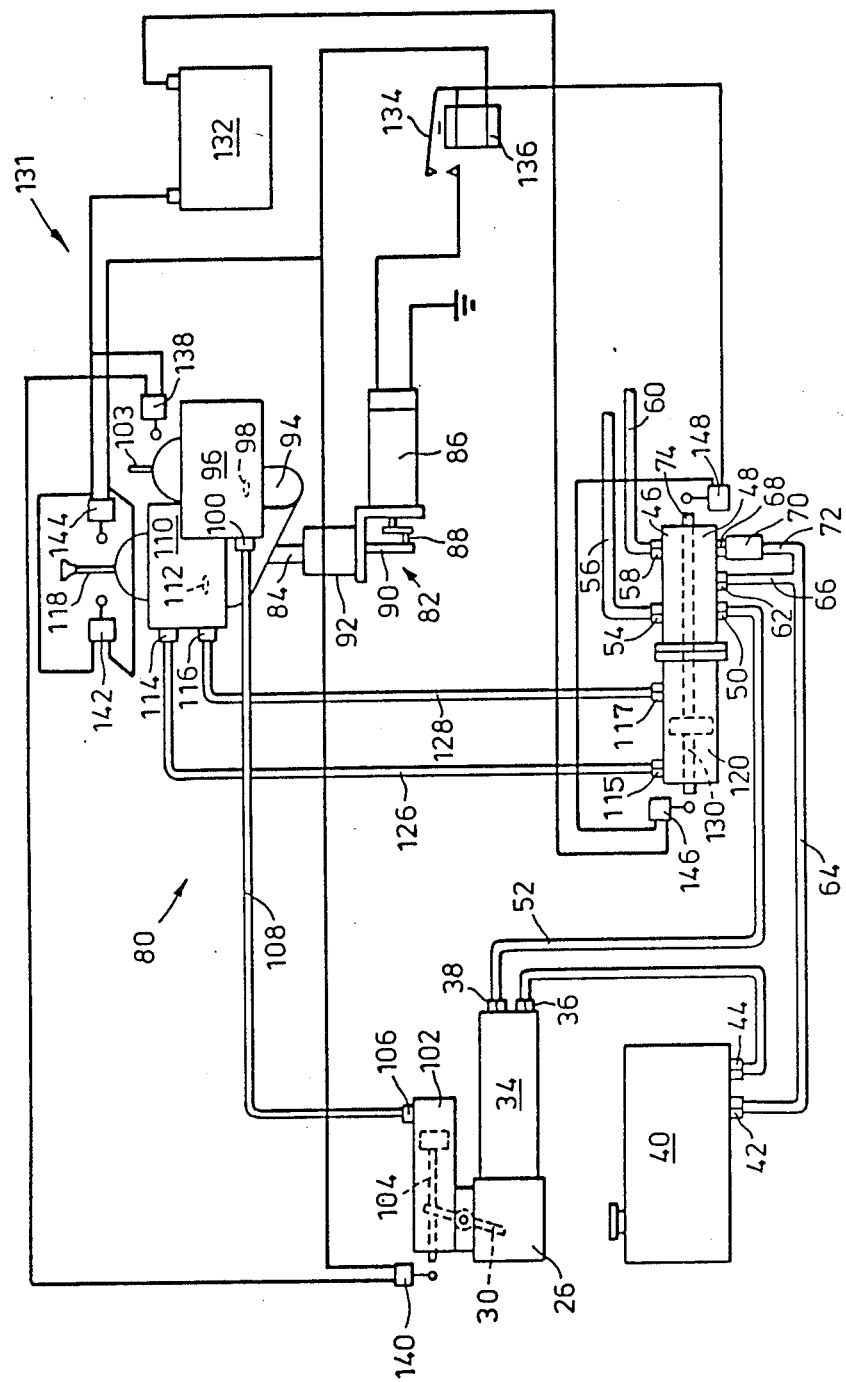
FIG. 2 is diagrammatic representation of the hydraulic, pneumatic and low voltage electrical system according to an embodiment of the present invention.

As shown more clearly in FIG. 2 of the drawings, the first control valve 46 has a valve body 48 which has a first hydraulic port 50 which is connected to the hydraulic pump output 38 by means of a conduit 52. The control valve 46 has a second hydraulic port 54 which is connected by means of a conduit 56 to the first hydraulic fluid connection 22 of the hydraulic lift cylinder 16. The first hydraulic fluid control valve 46 also has a third port 58 which is connected to the second connection 24 of the lift cylinder 16 by means of a conduit 60. A fourth port 62 is connected to the input 42 of the reservoir 40 by means of a branch 66 of a conduit 64. A fifth port 68 is connected through a flow restrictor 70 which is located in a branch 72 of the conduit 64 to the input port 42 of the reservoir 40. The flow restrictor 70 serves to limit the rate of flow of hydraulic fluid to the reservoir to limit the rate of lowering of the container body 12 in a conventional manner.

A valve member 74 is slidably mounted in the valve body 48 for movement between a first position in which the first port 50 communicates with the second port 52 to supply hydraulic fluid to the lift cylinder 16 and the third port 58 communicates with the fourth port 62 to drain hydraulic fluid from the lift cylinder into the reservoir and a second position in which the first port 50 communicates with the third port 58 to supply hydraulic fluid to contract the lift cylinder and the second port 54 is connected to the fifth port 68 to drain fluid from the lift cylinder to the reservoir through the flow restrictor 68.

The pneumatic control system is generally identified by the reference numeral 80 and comprises an air compressor 82 which has an air output 84. The compressor 82 is a small capacity air compressor such as that which is sold by Webster Mfg. (London) Limited of London, Ontario, Canada and identified by the trade mark MINI-AIR which is capable of providing up to 90 p.s.i., The compressor 82 comprises a low voltage electric motor 86 which has an output crank shaft 88 connected to a connecting rod 90. A piston (not shown) is mounted at the other end of the connecting rod and reciprocates in cylinder 92. The air output 84 of the compressor 82 is connected to a manifold 94. A first pneumatic control valve 96 is provided for controlling the operation of the power take-off 26. The first pneumatic control valve 96 has an air input 98 and an air output 100. The air input 98 communicates with the manifold 94. A manually operable valve member 103 is moveable between a closed position preventing the passage of air and an open position permitting the passage of air through the first pneumatic control valve from the input 98 to the output 100. A first pneumatic actuator 102 is provided for controlling the movement of the actuator arm 30 on the power take-off in response to movement of the first pneumatic control valve 96. The first pneumatic actuator has an actuator member 104 slidably mounted therein between a first position in which it causes the actuator arm 30 to disengage the power take-off 26 from the engine and a second position in which it engages the power take-off with the engine The first pneumatic actuator has an air input port 106 connected to the air output 100 of the first pneumatic control valve 96 such that when air is supplied to the first pneumatic actuator 102, when the first control valve 96 is in its opened position, the actuator member 104 is moved to its second position engaging the power take-off The actuator member 104 is normally biased towards its first position so as to disengage the power take-off when the first pneumatic actuator 102 is returned to its first position which permits venting of the first pneumatic actuator 102 through conduit 108.

A second pneumatic control valve 110 is provided for the purposes of controlling the operation of the first hydraulic fluid control valve 46. The second pneumatic control valve 110 has an air input 112 communicating with the manifold 94 and first and second air outputs 114 and 116. A valve member 118 is mounted for movement in the second control valve 110 between a neutral position preventing the passage of air from the air input 112 to either of the air outputs 114 or 116 and a first open position to permit the passage of air from the air manifold 94 to the first output 114 and a second open position to permit the passage of air from the manifold 94 to the second air output 116.

A second pneumatic actuator 120 is a double acting actuator having first and second air ports 115 and 117 which communicate with the first and second air outputs 114 and 116 by means of conduits 126 and 128 respectively. A second actuator member 130 is drivingly connected to the valve member 74 of the first hydraulic fluid control valve 46 and serves to move the valve member 74 to its first position in response to movement of the second pneumatic control 110 to its first open position and move the valve member 74 to its second position in response to movement of the second pneumatic control 110 to its second open position. From the foregoing, it will be seen that the pneumatic control system is a self-contained system in which the source of compressed air is the air compressor 82. The compressed air is directed to the first pneumatic actuator 102 through the first pneumatic control valve 96 and the compressed air is directed to the second pneumatic control actuator 120 through the second pneumatic control valve 110.

A low voltage electrical circuit generally identified by the reference numeral 131 is provided for powering the compressor 82 and controlling the operation of the compressor 82. The power source is a battery 132 which is the normal operating battery of the motor vehicle which is usually a 12 volt battery. A normally open circuit breaker 134 is powered by a relay 136 which, when activated, closes the circuit breaker 134 to power the compressor 82. A normally open first switch 138 is associated with the first pneumatic control valve 96 and a normally closed second switch 140 is associated with the first pneumatic actuator 102 to control the operation of the compressor 82 in response to the requirements for control of the operation of the power take-off 26.

In use when it is necessary to activate the power take-off 126, the first pneumatic control lever 103 is moved from its first position to its second position to close the first switch 138 and thereby activate the relay 136 to close the circuit breaker 134 to supply power to the compressor 82. The compressed air is transmitted from the compressor 82 through the conduit 108 to the air input 106 and to the first actuator 102. The compressed air entering the actuator 102 displaces the actuator member 104 to its second position causing the actuator arm 30 to engage the power take-off 26 with the engine thereby to power the pump 34. When the actuator member 104 is located in its second position, it will engage the normally closed second switch 140 which will open to interrupt the supply of power to the relay 136 thereby permitting the circuit breaker 134 to return to its open position to stop the compressor. The compressor will remain inactive until the pneumatic pressure at the first actuator 102 drops below that required to maintain the actuator member 104 in the position retaining the power take-off in operation. When the pneumatic pressure at the first actuator 102 drops below that required to maintain the actuator member 104 in its second position, the second switch 140 will again close and this will reactivate the relay 136 to close the circuit breaker 134 to reactivate the compressor 82.

To control the operation of the second pneumatic actuator 120, normally open third and fourth switches 142 and 144 are arranged in series/parallel and associated with the second pneumatic control valve 110 so as to be operably engaged by the valve actuator 118 such that movement of the second pneumatic control valve from the neutral position illustrated in FIG. 2 to one or other of its first or second positions, will close one of the third or fourth switches 142, 144 to activate the relay 136 to close the circuit breaker 134 to activate the compressor to supply air under pressure to the second pneumatic actuator 102. Normally closed fifth and sixth switches 146 and 148 are associated with the second pneumatic actuator 120 and are arranged in series with the relay 136 whereby when the pneumatic pressure applied t the second pneumatic actuator 120 is equal to that required to maintain the first hydraulic control valve 46 in the position dictated by the second pneumatic control valve 110, one or other of the fifth or sixth switches will be opened to deactivate the relay 136 to stop the compressor and when the pressure applied to the second pneumatic control valve 120 drops below that required to maintain the first hydraulic control valve in the required position, both the fifth and sixth switches will be closed to activate the compressor when the relay 136 is activated to close the circuit breaker 134.

Figure 3:
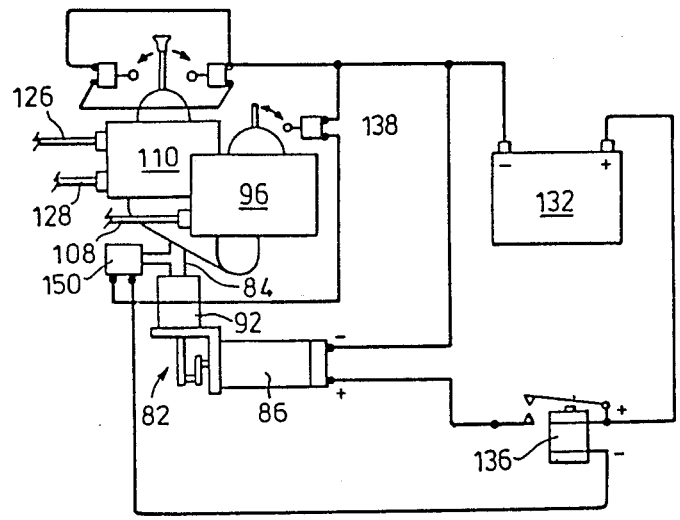
FIG. 3 is a diagram similar to a portion of FIG. 2 illustrating a further embodiment of the present invention.

Various modifications of the low voltage electrical circuit are possible while maintaining the required operational control of the hydraulic circuit and one such modification is illustrated in FIG. 3 of the drawings wherein like numerals are applied to like parts to those of FIG. 2. In this embodiment it is possible to operate the hydraulic system without requiring the normally closed second switch 140 and the normally closed fifth and sixth switches 146 and 148. In the embodiment illustrated in FIG. 3 of the drawing, a pressure sensing switch 150 communicates with the air output 84 from the cylinder 92 of the compressor 82. The pressure sensing switch 150 is wired in series with the normally open first switch 138 and the relay 136. The pressure sensing switch 150 will close to activate the relay when the air pressure in the output 84 drops below a predetermined minimum and will open when the pressure exceeds a predetermined maximum. Typical operating pressures for the pneumatic system of the present invention are a minimum of 90 psi and a maximum of 100 psi with the result that the pressure sensing switches 50 may be designed to operate within these limits so as to open when the pressure exceeds 100 psi and close when the pressure drops below 90 psi.

Figure 4:
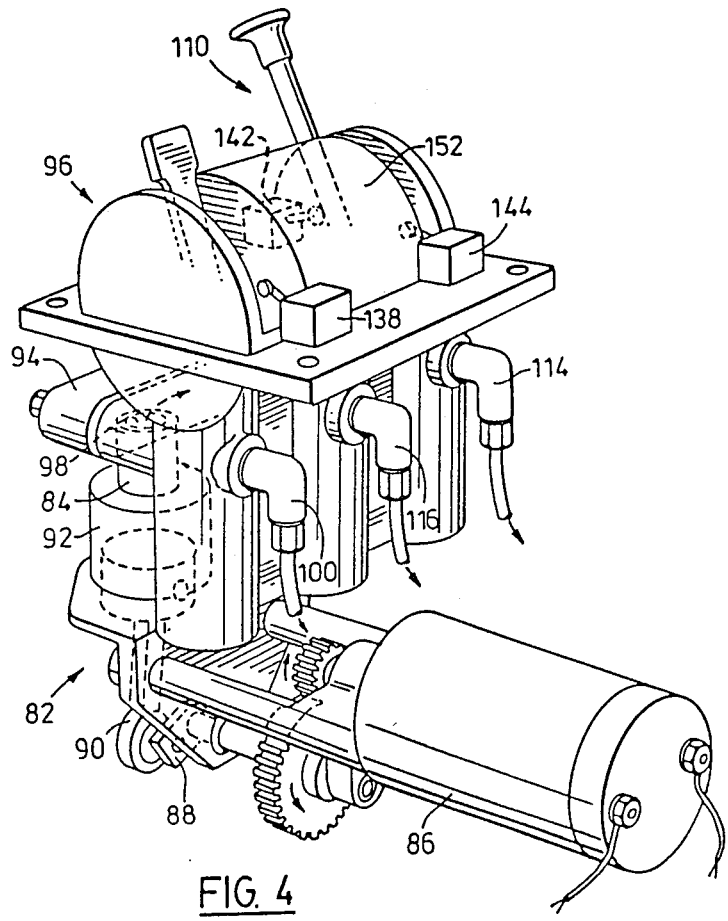
FIG. 4 is a pictorial illustration of a compressor and pneumatic control valve assembly constructed in accordance with an embodiment of the present invention.

The first pneumatic control valve 96 and the second pneumatic control valve 110 may be combined in a unitary housing 152 as illustrated in FIG. 4 of the drawings and may be in the form of a pneumatic valve such as that described in U.S. patent application Ser. No. 06/569,654 filed Jan. 10, 1984 now U.S. Pat. No. 4,526,197 and will not therefore be described in detail.

From the foregoing, it will be apparent that the pneumatic control system of the present invention is a self-contained system which is powered by an independent compressor which is in turn powered by the low voltage electrical circuit of the vehicle. It follows that this pneumatic control system can be utilized to control the operation of an hydraulic power system of a vehicle which does not have a pneumatic brake system. Furthermore the self-contained pneumatic control system of the present invention is so inexpensive as to be used in preference to tapping into the air lines of a pneumatic brake system even when such a pneumatic brake system is available thereby to eliminate the safety drawbacks of tapping into the pneumatic circuit of air brakes.

These and other advantages of the system of the present invention will be apparent to those skilled in the art.

I claim:

1. In a motor vehicle having a battery-operated low voltage electrical system, an hydraulically powered system for operating one or more high power hydraulic cylinders and a pneumatic system for regulating the operation of the hydraulic system, the improvement comprising a low capacity compressor mounted to the vehicle, means for connecting said low capacity compressor to the pneumatic system, a low voltage electric motor mounted on the vehicle, drive means for connecting said low voltage electric motor to said low capacity compressor, electrical means connecting said low voltage electric motor to the low voltage electrical system and control means for selectively operating said low voltage electric motor to power said low capacity compressor to thereby pressurize the pneumatic system.

2. In a motor vehicle as claimed in claim 1, the further improvement of said control means including a pressure sensing means in the pneumatic system for activating and deactivating the low voltage electric motor to maintain the pressure in the pneumatic system within predetermined limits.

3. In a motor vehicle as claimed in claim 2, the further improvement of said control means including a circuit breaker means in the low voltage electrical system communicating with the pressure sensing means to activate and deactivate the electric motor as aforesaid.

4. In a motor vehicle as claimed in claim 1, which is the from of a dump truck having a container body wherein the hydraulically powered system includes an extensible lift cylinder for raising and lowering a container body and a lift control valve which is movable between first and second positions to control the supply of hydraulic fluid to the lift cylinder to extend or contract it, and wherein the pneumatic valve system includes a pneumatic lift actuator which is operable to move the lift control valve between its first and second positions, the improvement of;

said control means including circuit breaker means in the low voltage electrical system for activating and deactivating said electric motor to control the operation of the compressor and lift control valve sensor means for determining the position of the lift control valve to open and close the circuit breaker as required in use.

5. In a motor vehicle as claimed in claim 1, which is in the form of a dump truck having a container body wherein the hydraulically powered system includes an extensible lift cylinder for raising and lowering the container body and a lift control valve which is movable between first and second positions to control the supply of hydraulic fluid to the lift cylinder to extend or contract it, and wherein the pneumatic system includes a pneumatic lift actuator which is operable to move the lift control valve between its first and second positions, the improvement of:

said control means including a circuit breaker in the low voltage electrical system which interrupts the power supply to said electric motor when open and completes the circuit to the electric motor when closed and pressure sensing means in the pneumatic system communicating with said circuit breaker to open and close said circuit breaker to activate and deactivate the electric motor to maintain the air pressure in the pneumatic system within predetermined limits required to operate the pneumatic system.

6. In a dump truck having a container body, a battery operated low voltage electrical system, an hydraulically powered system for operating an extensible lift cylinder for raising and lowering the container body and a lift control valve which is movable between first and second positions to control the supply of hydraulic fluid to the lift cylinder to extend or contract it, and a pneumatic system which includes a pneumatic lift actuator which is operable to move the lift control between its first and second positions, the improvement wherein the pneumatic system is powered by a low capacity compressor which is powered by a low voltage electric motor which is electrically connected to the low voltage circuit of the motor vehicle to drive the compressor to pressurize the pneumatic system and wherein circuit breaker means is provided in the low voltage electrical circuit for activating and deactivating said electrical motor to control the operation of the compressor and lift control valve sensor means for determining the position of the lift control valve to open and close the circuit breaker as required in use and wherein the low voltage electrical circuit which activates the circuit breaker includes two switches which are arranged in series with the operating circuit of the circuit breaker and associated with the lift actuator such that when the pneumatic pressure applied to the pneumatic lift actuator is equal to that required to maintain the lift control valve in its required position, one or other of the switches will be opened to open the circuit breaker to stop the compressor and when the pressure applied to the pneumatic lift valve drops below that required to maintain the lift control valve in its required position, both of said switches will be closed to close the circuit breaker to reactivate the compressor.

7. In a dump truck having a constrainer body, a battery operated low voltage electrical system, an hydraulically powered system for operating an extensible lift cylinder for raising and lowering the container body and a lift control valve which is movable between first and second positions to control the supply of hydraulic fluid to the lift cylinder to extend or contract it, and a pneumatic system which includes a pneumatic lift actuator which is operable to move the lift control between its first and second positions, the improvement wherein the pneumatic system is powered by a low capacity compressor which is powered by a low voltage electric motor which is electrically connected to the low voltage circuit circuit of the motor vehicle to drive the compressor to pressurize the pneumatic system and wherein circuit breaker means is provided in the low voltage electrical circuit for activating and deactivating said electrical motor to control the operation of the compressor and lift control valve sensor means for determining the position of the lift control valve to open and close the circuit breaker as required in use and a normally open circuit breaker in said electrical circuit which is movable between its open position interrupting the supply of electrical power from the battery to the compressor and a closed position permitting the supply of electrical power to the compressor, a first branch of said electrical circuit leading from the battery to a normally opened first switch associated with the first pneumatic control valve which serves to control a power take-off from the engine of the vehicle and a normally closed second switch associated with a first pneumatic actuator which serves to activate and deactivate the power take-off and communicating with said circuit breaker such that when the first pneumatic control valve is moved to its second position, said normally opened first switch is closed and electrical power is supplied to the circuit breaker to close it to supply power to the compressor until the pneumatic pressure displaces the pneumatic actuator beyond its second position to open said normally closed second switch to deactivate said circuit breaker to deactivate the compressor to permit the pneumatic acutator to return to its operative position to again close said second switch to close the circuit breaker and reactivate the compressor.

8. In a motor vehicle as claimed in claim 7, the further improvement of a second branch line into the electrical circuit having normally opened third and fourth switches arranged in series/parallel and associated with a second pneumatic control valve which serves to control the operation of a second pneumatic actuator which is movable between first and second positions to activate and deactivate said lift control valve, said second pneumatic control valve being movable between a neutral position and first and second operative positions such that the movement of the second control valve from its neutral position to one or other of its first or second positions will close one of said third or fourth switches to close the circuit breaker to activate said compressor to supply air under pressure to said second pneumatic acutator and to move it toward its first or second position.

9. In a motor vehicle as claimed in claim 8, the further improvement of normally closed fifth and sixth switches associated with said second pneumatic actuator and arranged in series with said circuit breaker whereby the pneumatic pressure applied to the second pneumatic actuator is equal to that required to maintain the lift control valve in the position dictated by the second pneumatic control valve, one or other of said fifth or sixth switches being opened to open the circuit breaker to stop the compressor and when the pressure applied to the second pneumatic valve drops below that required to maintain the lift control valve in the required position, both the fifth and sixth switches will be closed to close the circuit breaker to reactivate the compressor.

10. A pneumatically controlled hydraulically powered operating system for raising and lowering a container body of a dump truck which is powered by an internal combustion engine comprising;

(1) an hydraulic power system comprising;

(1.1) a double-acting hydraulic lift cylinder having one end mounted on the truck and the other end connected to the container body, said cylinder having first and second hydraulic fluid connections each of which serve to admit hydraulic fluid to and drain hydraulic fluid from said cylinder such that when fluid is admitted through the first connection the cylinder will be extended and when fluid is admitted through the second connection, the cylinder will be contracted to effect raising and lowering of the container body as required in use, (1.2) a power take-off having means for selectively drivingly engaging or disengaging it from the engine, (1.3) an hydraulic pump drivingly connected to the power take-off so as to be operable when the power take-off is drivingly engaged by the engine and inoperable when the power take-off is disengaged from the engine, said hydraulic pump having an input and an output for hydraulic fluid, (1.4) an hydraulic fluid reservoir having an hydraulic fluid input port and an hydraulic fluid output port, said output port being connected to the input of said hydraulic pump, (1.5) a first control valve having a valve body which has a first hydraulic port connected to said output of said hydraulic pump, a second port connected to the first connection of the lift cylinder, a third port connected to the second connection of the lift cylinder, a fourth port connected to the input of said reservoir, a fifth port connected to the input of said reservoir through a flow restrictor which limits the rate of flow to the reservoir to limit the rate of lowering of the body, and, a valve member mounted in said valve body for movement between a first position in which the first port communicates with the second port to supply hydraulic fluid to the lift cylinder and the third port communicates with the fourth port to drain hydraulic fluid from the lift cylinder into the reservoir and a second position in which the first port is connected to the third port to supply hydraulic fluid to contract the lift cylinder and the second port is connected to the fifth port to drain fluid from the lift cylinder to the reservoir, (2) and a pneumatic control system comprising;

(2.1) an air compressor having an air output, (2.2) a compressed air manifold communicating with said air output of said compressor to receive compressed air, (2.3) a first pneumatic control valve having an air input passage and an air output passage, the air input passage communicating with said air manifold, and a manually operable valve member moveable between a closed position preventing passage of air and an open position permitting passage of air through said first pneumatic control valve, (2.4) a first pneumatic actuator communicating said means for engaging or disengaging said power take-off, said first pneumatic actuator having an actuator member moveable between a first position in which it disengages said power take-off from the engine and a second position in which it engages the power take-off with the engine, said first pneumatic actuator having an air input port connected to the air output port of said first pneumatic control valve such that when air is supplied to the first pneumatic actuator when the first pneumatic control valve is in its open position, the actuator member is moved to its second position engaging the power take-off, (2.5) a second pneumatic control valve having an air input communicating with said air manifold and first and second air outputs and a valve member mounted for movement between a neutral position preventing the passage of air from the air input to either one of the air outputs, and a first open position to permit the passage of air to the first output and a second open position to permit the passage of air to the second output, a double acting actuator cylinder having first and second air ports communicating with said first and second air outputs of said second pneumatic control valve and a second actuator member mounted for movement in said second pneumatic control valve to a first position in response to the supply of air pressure to said first air port and to a second position in response to the supply of air to the second air port, said second actuator being drivingly connected to said valve member of said first control valve of said hydraulic power system to move said valve member to its first position in response to movement to the first position of the actuator and its second position in response to movement to the second position of the actuator;

(3) a low voltage electrical circuit for driving the compressor comprising;

(3.1) a battery, (3.2) an electrical circuit for connecting the compressor to the battery, (3.3) a normally open circuit breaker in said electrical circuit which is moveable between its open position interrupting the supply of electrical power from the battery to the compressor and a closed position permitting the supply of electrical power to the compressor, (3.4) a first branch of said electrical circuit leading from the battery to a normally open first switch associated with the first pneumatic control valve and a normally closed second switch associated with the first pneumatic actuator and communicating with said circuit breaker such that when the first pneumatic control valve is moved to its second position, said normally open first switch is closed and electrical power is supplied to said circuit breaker to close it to supply power to the compressor until the pneumatic pressure displaces the first pneumatic actuator beyond its second position to open said normally closed second switch to deactivate said circuit breaker to deactivate the compressor to permit the first pneumatic actuator to return to its operative position to again close said second switch to close the circuit breaker and reactivate the compressor, (3.5) a second branch line of said electrical circuit having normally open third and fourth switches arranged in series/parallel and associated with said second pneumatic control valve such that movement of the second pneumatic control valve from the neutral position to one or the other of its first or second positions will close one of said third or fourth switches to close said circuit breaker to activate said compressor to supply air under pressure to said second pneumatic actuator to move it toward its first or second position, (3.6) and normally closed fifth and sixth switches associated with said second pneumatic actuator and arranged in series with said circuit breaker whereby when the pneumatic pressure applied to the second pneumatic control valve is equal to that required to maintain the lift control valve in the position dictated by the second pneumatic control valve, one or other of said fifth or sixth switches will be opened to open the circuit breaker to stop the compressor when the pressure applied to the second pneumatic control valve drops below that required to maintain the lift control valve in the required position, both the fifth and sixth switches will be closed to close the circuit breaker and reactivate the compressor.

11. A pneumatically controlled hydraulically powered operating system for raising and lowering a container body of a dump truck which is powered by an internal combustion engine comprising;

(1) an hydraulically powered system comprising;

(1.1) a double-acting hydraulic lift cylinder having one end mounted on the truck and the other end connected to the container body, said cylinder having first and second hydraulic fluid connections each of which serve to admit hydraulic fluid to and drain hydraulic fluid from said cylinder such that when fluid is admitted through the first connection the cylinder will be extended and when fluid is admitted through the second connection, the cylinder will be contracted to effect raising and lowering of the container body as required in use, (1.2) a power take-off having means for selectively drivingly engaging or disengaging it from the engine, (1.3) an hydraulic pump drivingly connected to the power take-off so as to be operable when the power take-off is drivingly engaged by the engine and inoperable when the power take-off is disengaged from the engine, said hydraulic pump having an input and an output for hydraulic fluid, (1.4) an hydraulic fluid reservoir having an hydraulic fluid input port and an hydraulic fluid output port, said output port being connected to the input of said hydraulic pump, (1.5) a first control valve having a valve body which has a first hydraulic port connected to said output of said hydraulic pump, a second port connected to the first connection of the lift cylinder, a third port connected to the second connection of the lift cylinder, a fourth port connected to the input of said reservoir, a fifth port connected to the input of said reservoir through a flow restrictor which limits the rate of flow to the reservoir to limit the rate of lowering of the body, and, a valve member mounted in said valve body for movement between a first position in which the first port communicates with the second port to supply hydraulic fluid to the lift cylinder and the third port communicates with the fourth port to drain hydraulic fluid from the lift cylinder into the reservoir and a second position in which the first port is connected to the third port to supply hydraulic fluid to contract the lift cylinder and the second port is connected to the fifth port to drain fluid from the lift cylinder to the reservoir, (2) and a pneumatic control system which provides a pneumatic circuit for controlling the operation of the hydraulically powered system comprising;

(2.1) an air compressor having an air output, (2.2) a compressed air manifold communicating with said air output of said compressor to receive compressed air, (2.3) a first pneumatic control valve having an air input passage and an air output passage, the air input passage communicating with said air manifold, and a manually operable valve member moveable between a closed position preventing passage of air and an open position permitting passage of air through said first control valve, (2.4) a first pneumatic actuator communicating said means for engaging or disengaging said power take-off, said first pneumatic actuator having an actuator member moveable between a first position in which it disengages said power take-off from the engine and a second position in which it engages the power take-off with the engine, said first pneumatic actuator having an air input port connected to the air output port of said first pneumatic control valve such that when air is supplied to the first pneumatic actuator when the first control valve is in its open position, the actuator member is moved to its second position engaging the power take-off, (2.5) a second pneumatic control valve having an air input communicating with said air manifold and first and second air outputs and a valve member mounted for movement between a neutral position preventing the passage of air from the air input to either one of the air outputs, and a first open position to permit the passage of air to the first output and a second open position to permit the passage of air to the second output, a double acting actuator cylinder having first and second air ports communicating with said first and second air outputs of said second pneumatic control valve and a second actuator member mounted for movement in said second pneumatic control valve to a first position in response to the supply of air pressure to said first air port and to a second position in response to the supply of air to the second air port, said second actuator member being drivingly connected to said valve member of said first control valve of said hydraulic power system to move said valve member to its first position in response to movement to the first position of the actuator and its second position in response to movement to the second position of the actuator;

(2.6) pressure sensing means for sensing the air pressure in the pneumatic system, (3) a low voltage electrical circuit for driving the compressor comprising;

(3.1) a battery, (3.2) an electrical circuit for connecting the compressor to the battery, (3.3) a normally open circuit breaker in said electrical circuit which is moveable between its open position interrupting the supply of electrical power from the battery to the compressor and a closed position permitting the supply of electrical power to the compressor, (3.4) a first branch of said electrical circuit leading from the battery to a normally open first switch associated with the first pneumatic control valve and a normally closed seventh switch associated with said pressure sensing means and communicating with said circuit breaker such that when the first control valve is moved to its second position, said normally open first switch is closed and electrical power is supplied to said circuit breaker to close it to supply power to the compressor until the pneumatic pressure in the pneumatic circuit increases beyond a predetermined upper limit and opens the seventh switch to deactivate said circuit breaker to deactivate the compressor until the pressure in the pneumatic circuit drops below a predetermined lower limit and closes the seventh switch to close the circuit breaker and reactivate the compressor, (3.5) a second branch line of said electrical circuit having normally open third and fourth switches arranged in series/parallel and associated with said second pneumatic control valve such that movement of the second pneumatic control valve from the neutral position to one or the other of its first or second positions will close one of said third or fourth switches to close said circuit breaker to activate said compressor to supply air under pressure to said second pneumatic actuator to move it toward its first or second position, said seventh switch being operational as aforesaid to open and close to maintain the air pressure within the required operating range whereby when the pneumatic pressure applied to the second pneumatic valve is equal to that required to maintain the lift control valve in the position dictated by the second pneumatic control valve.

* * * * *